US009760957B2

(12) United States Patent
Hug et al.

(10) Patent No.: US 9,760,957 B2
(45) Date of Patent: Sep. 12, 2017

(54) DISTRIBUTED METHODS AND SOFTWARE FOR BALANCING SUPPLY AND DEMAND IN AN ELECTRIC POWER NETWORK

(71) Applicant: Carnegie Mellon University, Pittsburgh, PA (US)

(72) Inventors: Gabriela Hug, Pittsburgh, PA (US); Soummya Kar, Pittsburgh, PA (US); Jose' Moura, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 481 days.

(21) Appl. No.: 14/334,106

(22) Filed: Jul. 17, 2014

(65) Prior Publication Data
US 2015/0025696 A1 Jan. 22, 2015

Related U.S. Application Data

(60) Provisional application No. 61/958,032, filed on Jul. 17, 2013.

(51) Int. Cl.
*G06F 19/00* (2011.01)
*G06Q 50/06* (2012.01)
*H02J 3/00* (2006.01)

(52) U.S. Cl.
CPC ........ *G06Q 50/06* (2013.01); *H02J 2003/007* (2013.01); *Y02E 60/76* (2013.01); *Y04S 40/22* (2013.01)

(58) Field of Classification Search
USPC ....................................................... 700/286
See application file for complete search history.

(56) References Cited

U.S. PATENT DOCUMENTS

| 6,633,823 | B2 * | 10/2003 | Bartone | H02J 3/14 |
| | | | | 700/295 |
| 2008/0319893 | A1 * | 12/2008 | Mashinsky | G06Q 40/04 |
| | | | | 705/37 |
| 2010/0138363 | A1 * | 6/2010 | Batterberry | G06Q 10/04 |
| | | | | 705/412 |

(Continued)

OTHER PUBLICATIONS

S. Kar and G. Hug. Distributed robust economic dispatch in power systems: A consensus + innovations approach. In IEEE Power and Energy Society General Meeting, Jul. 2012; pp. 1-8.

(Continued)

Primary Examiner — Kidest Bahta
(74) Attorney, Agent, or Firm — Downs Rachlin Martin PLLC

(57) ABSTRACT

Methods and software for managing electric power networks in a distributed manner. A supply and demand balancing scheme is used across a network of agents to facilitate agreement on the optimal incremental price for energy provision in an electric power network subject to the constraint that the total generation in the electric power network matches the total network demand. A multi-step optimization approach is provided that incorporates inter-temporal constraints, allowing for optimal integration of flexible power loads and power storage entities and taking into account power generation ramp rate constraints at individual generation entities. The approach is extended to cope with line flow constraints imposed by the physical system topology and transmission line limits/capacities.

29 Claims, 12 Drawing Sheets

(56) References Cited

U.S. PATENT DOCUMENTS

| | | | | |
|---|---|---|---|---|
| 2011/0137482 A1* | 6/2011 | Toba | ................. | H02J 3/46 |
| | | | | 700/291 |
| 2011/0208365 A1* | 8/2011 | Miller | ................. | G06Q 50/06 |
| | | | | 700/291 |
| 2012/0109393 A1* | 5/2012 | Kosaka | ................. | G06Q 10/06 |
| | | | | 700/291 |
| 2012/0130556 A1* | 5/2012 | Marhoefer | ................. | H02J 3/32 |
| | | | | 700/291 |
| 2012/0323390 A1* | 12/2012 | Kobayasi | ................. | H02J 3/14 |
| | | | | 700/295 |
| 2014/0067142 A1* | 3/2014 | Steven | ................. | G06Q 10/00 |
| | | | | 700/291 |

OTHER PUBLICATIONS

S. Kar, J.M.F. Moura, and K. Ramanan. Distributed parameter estimation in sensor networks: nonlinear observation models and imperfect communication. IEEE Transactions on Information Theory, 58(6):3575-3606, Jun. 2012.

Z. Zhang and M.-Y. Chow. Incremental cost consensus algorithm in a smart grid environment. In IEEE Power and Energy Society General Meeting, Jul. 2011; pp. 1-6.

Z. Zhang, X. Ying, and M.-Y. Chow. Decentralizing the economic dispatch problem using a two-level incremental cost consensus algorithm in a smart grid environment. In North American Power Symposium (NAPS), Aug. 2011.

* cited by examiner

DISTRIBUTED METHODS AND SOFTWARE FOR BALANCING SUPPLY AND DEMAND IN AN ELECTRIC POWER NETWORK

RELATED APPLICATIONS

This application claims the benefit of the Provisional Patent Application Ser. No. 61/958,032, filed on Jul. 17, 2013, and titled "Distributed Method for Balancing Supply and Demand in an Electric Power Network," which is hereby incorporated herein by reference in its entirety.

FIELD OF THE INVENTION

The present invention generally relates to the field of electric power generation and allocation. In particular, the present invention is directed to distributed methods and software for balancing supply and demand in an electric power network.

BACKGROUND

Traditionally, electric power networks have been controlled by a few centralized entities. Decisions concerning the operation of the network, including the dispatch of power generated, have originated from central locations of such entities. With the transition from a system with a few major dispatchable generation plants and inflexible loads to a system with a large amount of distributed generation and increasingly "smart" or "intelligent" participants (i.e., devices built with components enabling them to be remotely controlled by a system operator or grid component and/or components enabling them to minimize costs or otherwise adapt to various line conditions) on the demand side, such a centralized approach is no longer sufficient. Hence, distributed approaches need to be developed.

SUMMARY OF THE DISCLOSURE

In one implementation, the present disclosure is directed to a method of balancing supply and demand to achieve a chosen performance in an electric power network that includes a plurality of electrical entities and a plurality of agents, wherein each of the plurality of electrical entities is one of 1) an electrical load entity, 2) an electric power generating entity, and 3) an energy storage entity, the method comprising: receiving, at a first agent, one or more sets of first balancing parameters from at least one second agent of the plurality of agents, the one or more sets of first balancing parameters comprising electricity pricing parameters and electrical grid parameters; executing, by the first agent, a set of balancing algorithms using the one or more sets of first balancing parameters and a first performance-based quantity to generate one or more second balancing parameters; and providing, by the first agent, the one or more second balancing parameters to at least one third agent of the plurality of agents.

In another implementation, the present disclosure is directed to an apparatus comprising a processor and memory, the memory containing computer executable instructions, which, when executed, cause the processor to execute a method according to the method described above.

In still another implementation, the present disclosure is directed to a machine-readable storage medium containing machine-executable instructions for performing a method of balancing supply and demand to achieve a chosen performance in an electric power network that includes a plurality of electrical entities and a plurality of agents, wherein each of the plurality of electrical entities is one of 1) an electrical load entity, 2) an electric power generating entity, and 3) an energy storage entity, the machine-executable instructions comprising: a first set of machine-executable instructions for receiving, at a first agent, one or more sets of first balancing parameters from at least one second agent of the plurality of agents, the one or more sets of first balancing parameters comprising electricity pricing parameters and electrical grid parameters; a second set of machine-executable instructions for executing, by the first agent, a set of balancing algorithms using the one or more sets of first balancing parameters and a first performance-based quantity to generate one or more second balancing parameters; and a third set of machine-executable instructions for providing, by the first agent, the one or more second balancing parameters to at least one third agent of the plurality of agents.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
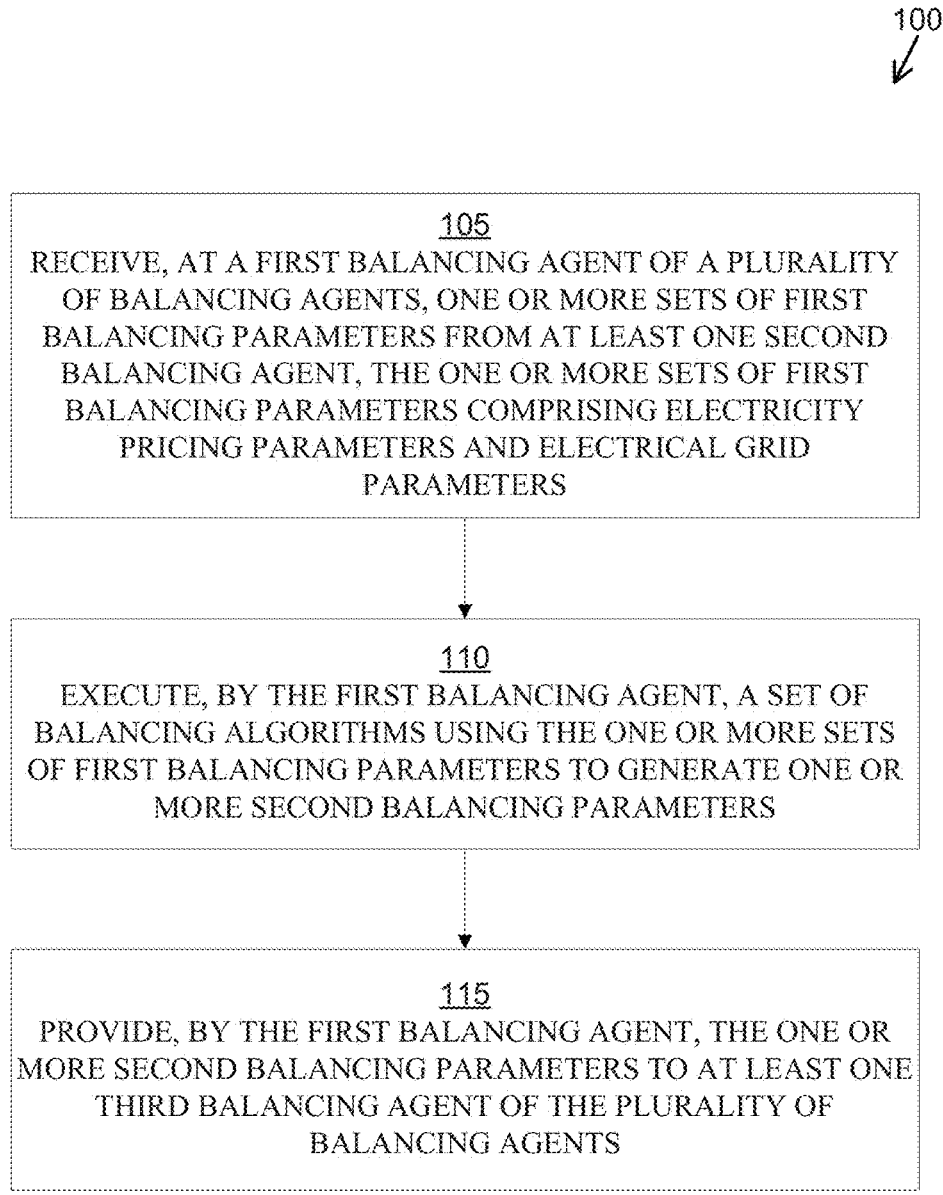
FIG. 1 is a high-level flowchart of a method of implementing a consensus+innovation algorithm in accordance with aspects of the present disclosure.

In contrast to electric power networks controlled by a single or a few centralized entities, a distributed approach requires a fundamentally different communication infrastructure from a centralized approach. In some centralized approaches, communication may be required between individual participants (network components) and one or more central entities, while in distributed approaches communication can take place directly between participants. Such a significantly enhanced communication infrastructure is a major component of the vision for the future electric power systems, such as a so-called "smart grid," that utilize distributed control and scheduling algorithms and could render central control entities obsolete. However, a distributed approach could also be implemented in conjunction with a central entity, enabling parallel and efficient computation at a central location. One general approach to managing electric power generation and allocation, referred to as the "economic dispatch approach," seeks to balance supply and demand for electric power in a network by analyzing the marginal cost of differing power generation sources connected to the network. In an electric power network of the present disclosure that uses the economic dispatch approach, the control system solves the resulting cost minimization problem in a distributed way. If no grid constraints are taken into account, this is enabled by the fact that in the optimal dispatch, the incremental costs of all generators are equal. Consequently, application of a "consensus algorithm" can be used to facilitate agreement on an incremental price of energy to be provided in a power system utilizing distributed control. A complicating factor, however, is that the total generation in the power network needs to be equal to the total load. Hence, the consensus algorithm needs to be extended by an "innovation part" in order to fulfill this constraint. In case of the inclusion of grid constraints, such as line constraints, the consensus can be carried out on a weighted sum of the marginal cost of generation and the Lagrange multipliers of the line constraints; the innovation parts correspond to the power balances at individual buses (or nodes), as opposed to an overall power balance.

In some conventional consensus algorithms intended to achieve a decentralized dispatch, a master node is defined that ensures that the power generation is equal to the load. This has two major implications: (1) the total load needs to be known by this master node and (2) the generators have to report the results of the consensus algorithm with respect to their power output to the master node. Therefore there is a need in the field for methods to manage power generation and allocation in a distributed manner, (i.e., without centralized control), while still balancing total generation and total load. This disclosure presents solutions for that need.

Aspects of the present invention include methods and software for balancing supply and demand to achieve a chosen performance in an electric power network in a distributed manner. Disclosed herein are approaches for coordinating a network of computing entities that, among other things, participate in executing a supply and demand balancing algorithm to distributively control an electric power network, such as a microgrid, smart grid, or any suitable electric power network. In some embodiments, it can be assumed that each generator, load, and storage device is connected to a specific node, which is shadowed (i.e., controlled or monitored) by an agent. Each respective agent defines cost and demand functions for the producer(s) and/or consumer(s) at its node and communicates with one or more other agents, such as one or more neighboring nodes. A goal of the communication process is to reach agreement on an incremental "price" for power provision while ensuring that overall generation is equal to load. The present disclosure describes a balancing algorithm that implements a consensus+innovations method that allows for a robust and fully distributed coordination of the components in an electric power system. Optimal usage of available storage and incorporation of ramp rate limitations can be achieved by applying the method to a multi-step economic dispatch. In the multi-step case, agents need to agree on prices for each time interval in a prediction horizon. Operational constraints can be observed by projecting the obtained temporary solution into the feasible solution space. Adding a receding horizon to the multi-step optimization enables a distributed model predictive control approach and allows for good initial starting points for the consensus+innovation method. In the context of this disclosure, it is important to note that agents are not to be interpreted as traditional, centralized supervisory control and data acquisition (SCADA) centers, which typically are associated with, configured to control, and/or responsible for large geographical areas (e.g., areas larger than 400 square miles). Rather, throughout this disclosure, including the claims, agents are to be interpreted as distributed entities that are associated with, configured to control, and/or responsible for relatively smaller geographical areas than traditional, centralized SCADA centers (e.g., areas smaller than 400 square miles, preferably smaller than 100 square miles, and most-preferably smaller than 10 square miles). As those of ordinary skill in the art will recognize after reading this disclosure in its entirety, a greater concentration of agents in a given area may allow the use of agents having less processing power and requiring less power consumption than may be required in implementations with more sparsely-distributed agents. In some embodiments, agents may comprise smart measurement units, such as one or more phase measurement units (PMUs).

Embodiments set forth below represent the necessary information to enable those skilled in the art to practice the embodiments and illustrate exemplary current best modes of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Turning now to the drawings, FIG. 1 illustrates an exemplary method 100 of balancing supply and demand in an electric power network according to certain aspects of the invention. As those skilled in the art will readily appreciate, an electric power system made in accordance with the present invention (examples of such being further described hereinbelow) may implement aspects of method 100 using any suitable computing and communications platforms. In this example, method 100 may begin with step 105, at which a first agent of a plurality of agents in an electric power network may receive one or more sets of first balancing parameters from at least one second agent, the one or more sets of first balancing parameters comprising electricity pricing parameters and electrical grid parameters. Notably, such electricity pricing parameters and electrical grid parameters may originate from a remote agent, a remote user, and/or a set of initial values, among others. At step 110, the first agent may execute a set of balancing algorithms using the one or more sets of first balancing parameters and a first performance-based quantity to generate one or more second balancing parameters. Such a first performance-based quantity may be a function of local cost parameters and local load information and such second balancing parameters may comprise (1) a current electricity price estimate and/or (2) the viability of potential power flows in the electric power network, among others. After the second balancing parameters are determined at step 110, the first agent may determine one or more adjustments to be made in the electric power network as a function of the calculated electricity price. These adjustments may comprise, for example, modifications that the first agent or a remote power control system or entity may implement to nodal power injections, storage entity power consumption, storage entity power production, load entity power consumption, and generator entity power production in the electric power network. At step 115, the first agent may provide the one or more second balancing parameters to at least one third agent of the plurality of agents, which, in some implementations, may be the second agent. Further details and examples of such algorithms are provided hereinbelow.

Figure 2:
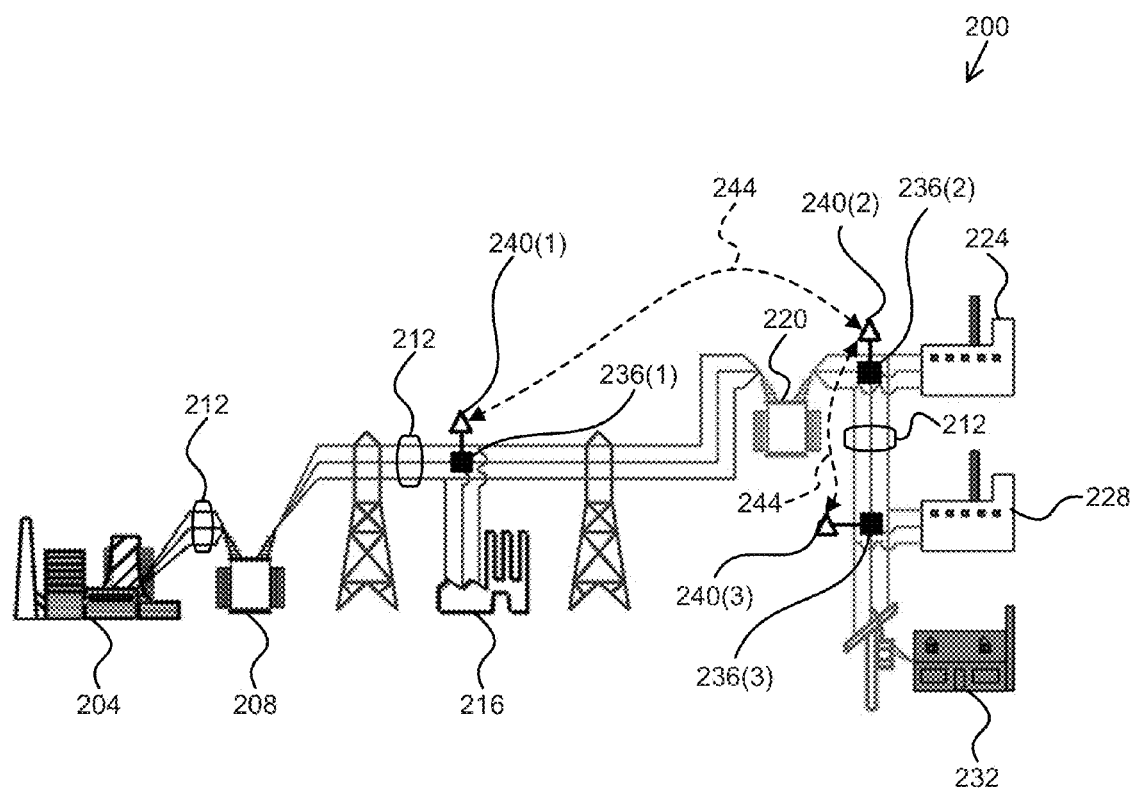
FIG. 2 is a diagram of an electric system that utilizes the method of FIG. 1.

Such a power control system as referred to above includes an electric power network that comprises one or more of various supply and demand entities, such as electric power generating entities; load entities, and energy storage entities. A highly simplified electric power system 200 is depicted in FIG. 2 and includes an electric power network having a generating station 204 (that may include one or more generating entities, such as one or more boiler/generator sets that can be individually activated), a step-up transformer 208, various power lines 212, a transmission customer 216 (that includes one or more load entities and zero or more storage entities), a substation step-down transformer 220, a subtransmission customer 224 (that includes one or more load entities), a primary customer 228 (that includes one or more load entities and zero or more storage entities), and a secondary customer 232 (that includes one or more load entities and zero or more storage entities). In this example, electric power network 200 includes nodes 236(1) to 236(3) and a power control system that includes agents 240(1) to 240(3) associated with respective ones of the nodes.

Agents 240(1) to 240(3) may communicate with one another via agent communications channels 244, each of which may by any suitable type of communications channel, such as a wireless or wired channel. Suitable wireless channels include radio frequency communications channels and light communications channels (e.g., infrared and visible light), among others. Suitable wired channels include dedicated communications wires and or optical fibers and secondary communications wires or optical fibers, including power lines 212 themselves. As those skilled in the art will appreciate, agent communications channels 244 allow agents that are not directly connected by communication channels 244, such as agents 240(1) and 240(3), to communicate via multi-hop communication by using agent 240(2) as a hop point. Although not particularly shown in FIG. 2, each agent 240(1) to 240(3) may also communicate via one or more entity communications channels with the entity(ies), for example, generating entity(ies), load entity(ies), and/or storage entity(ies) connected to the node 236(1) to 236(3) with which that agent is associated. Like agent communications channels 244, each entity communications channel may comprise and one or more of the wireless and wired communications channels noted above.

Depending on their particular location in an electric power network, like electric power network 200, an agent may have various components, such as those described further herein. However, one important aspect of each agent is that it must be able to communicate with at least one other agent in the distributed control system. In this way, relatively independent and autonomous agents can be installed at various locations in an electric power network while still allowing the agents to communicate with one another using various communication technologies, such as wired, wireless, and/or power line communications networks, among others. As such, even if a particular agent is not in direct communication with other components of the electric power network, as described above, settings and parameters can cascade through the system among the variously interconnected power control systems, allowing each individual agent to participate in controlling power allocation in the electric power network in an intelligent and distributed fashion. Relatedly, an important aspect of the collection of agents is that they communicate in a manner that forms a single network composed of all of the agents. Those skilled in the art will readily appreciate that there are many ways that this can be accomplished, from each agent communicating with only one or more of its nearest neighboring agents in a manner that each agent is in communication with at least one other agent to one or more agents in communication with one or more agents no matter what the physical proximity of the other agent(s).

As briefly discussed above, aspects of the present disclosure are directed to the management of an electric power network, which may include a few nodes and constitute a microgrid or a large number of nodes associated with a large-scale power system network. Such networks may include dispatchable and non-dispatchable generators (generating entities), critical/inflexible and non-critical/flexible loads (load entities), and storage entities. A storage entity may include any of a variety of types of electrical energy storage devices, including storage batteries, supercapacitors, and plug-in electric vehicles, which may be available only intermittently. To address such conditions, a mathematical problem formulation is provided to explain the derivation of a distributed algorithm in accordance with one aspect of the present invention. First, a single time step formulation is derived, then that formulation is extended to include inter-temporal constraints in a multi-step formulation.

In some embodiments, a mathematical problem formulation begins with assigning a cost/demand function to each component n. Although those skilled in the art will readily recognize that such a cost/demand function need not necessarily be quadratic, an approach is illustrated hereinbelow for a quadratic cost/demand functions assigned to each component n as provided by Equation 1, $$C_n(P_n) = \frac{1}{2}a_n P_n^2 + b_n P_n + c_n \qquad \text{(Eqn. 1)}$$

with $C_n(P_n) \geq 0$ and $P_n > 0$ if the power is generated or injected into the system and $P_n < 0$ if it is consumed or drawn from the system. For generators, the function reflects the costs of producing the power $P_n$, whereas for loads it is the (negative) cost the load is willing to pay for power $|P_n|$. For a storage entity, $P_n$ is positive whenever the storage entity is discharging, i.e., the function corresponds to the amount the storage entity is willing to accept for the provision of $P_n$, and it is negative whenever the storage entity is charging, during which the storage entity can be said to act like a load. The power $P_n$ is upper and lower bounded, as indicated by Condition 2, $$\underline{P}_n \leq P_n \leq \overline{P}_n \qquad \text{(Cnd. 2)}$$

with $\underline{P}_n$, $\overline{P}_n \geq 0$ for generators, $\underline{P}_n$, $\overline{P}_n \leq 0$ for loads, and $\underline{P}_n \leq 0$, $\overline{P}_n \geq 0$ for storage entities.

A primary objective is to determine the settings of the components, i.e., $P_n$, such as to maximize social welfare given by Equation 3, $$SW = -\sum_{n=1}^{N} C_n(P_n) \qquad \text{(Eqn. 3)}$$

and fulfilling the power balance given by Equation 4, $$\sum_{n=1}^{N} P_n = 0 \qquad \text{(Eqn. 4)}$$

where N is the total number of components to be coordinated. The solution to this optimization problem corresponds to the settings which result in equal marginal costs, as specified in Equation 5, $$dC_n(P_n) = a_n P_n + b_n \qquad \text{(Eqn. 5)}$$

for all of the components.

One goal of a distributed algorithm can now be defined as to find the equilibrium given by Equation 6.

$$\sum_{n=1}^{N} P_n = 0 \text{ and } \lambda_n = \lambda^*, n = 1, \ldots, N. \qquad \text{(Eqn. 6)}$$

If assigning an agent to each of the nodes, these agents need to agree on the price $\lambda^*$ and total power consumed needs to be equal to total power generated.

When introducing energy storage into the system, it is indispensable to optimize over multiple time steps concurrently, because not only is instantaneous power limited but also overall energy. In order to take into account these inter-temporal constraints and to make efficient use of the available storage capacity, the single step problem can be extended to a multi-step optimization problem. This allows for including other inter-temporal constraints, such as ramping limitations on generation output. Hence, the problem formulation can be given by Formula 7 and Conditions 8-10, $$\max_{P_{n,k}} \sum_{k=0}^{K-1} \sum_{n=1}^{N} (-C_{n,k}(P_{n,k})) \qquad \text{(Fma. 7)}$$

$$\text{s.t.} \sum_{n=1}^{N} P_{n,k} = 0, k = 0, \ldots, K-1 \qquad \text{(Cdn. 8)}$$

$$\underline{P}_{n,k} \leq P_{n,k} \leq \overline{P}_{n,k}, k = 0, \ldots, K-1 \qquad \text{(Cdn. 9)}$$

$$\Delta \underline{P}_n \leq P_{n,k} - P_{n,k-1} \leq \Delta \overline{P}_n, k = 0, \ldots, K-1 \qquad \text{(Cdn. 10)}$$

and for storage devices additionally by Condition 11, $$\underline{E}_n \leq E_{n,0} - \sum_{l=0}^{k} P_{n,l} \leq \overline{E}_n, k = 0, \ldots, K-1 \qquad \text{(Cdn. 11)}$$

Where $P_{n,k}$ is the power output of component n at time step k and K is the number of steps considered in the multi-step optimization. The constraint Condition 8 corresponds to the power balance at each step, Condition 9 is the limit on instantaneous power injection/consumption, Condition 10 corresponds to ramping limits with lower and upper ramping limits $\Delta \underline{P}_R$, $\Delta \overline{P}_n$, and Condition 11 incorporates the upper and lower limits $\underline{E}_n$, $\overline{E}_n$ on stored energy $E_{n,k}$. The initial values for power injection/withdrawal are denoted by $P_{n,-1}$ and $E_{n,0}$, respectively.

Furthermore, a terminal constraint can be added as provided by Condition 12, $$E_{n,N} = E_{n,0} - \sum_{l=0}^{K-1} P_{n,l} = E_n^f \qquad \text{(Cdn. 12)}$$

for storage, which will ensure that the energy level $E_{n,N}$ at the end of the optimization horizon is equal to a fixed value $E_n^f$, e.g., $E_n^f = 0.5 \cdot \overline{E}_n$. Adding such a terminal constraint in essence corresponds to adjusting the cost function parameter $b_n$. This value $b_n$ is equal to the price below which the storage charges and above which it discharges.

The optimal solution to the above problem is given by Equation 13, $$\sum_{n=1}^{N} P_{n,k} = 0, \lambda_{n,k} = \lambda_k^*, k = 0, \ldots, K-1 \qquad \text{(Eqn. 13)}$$

while fulfilling all of the inter-temporal constraint Conditions 10-12. Here, $\lambda^*_k$ is the marginal cost/price at time step k of the horizon at the optimum and $\lambda_{n,k}$ is a local copy of this variable of component n.

When integrating line constraints the problem corresponds to an "optimal power flow," for which the goal is to determine the generation dispatch which minimizes the cost to supply a given load while taking into account operational constraints, such as line limits and generation capacities. Modeling generation costs using the quadratic cost function of this example and assuming a DC power flow approximation, the mathematical problem formulation results in Formula 14 and Conditions 15-18, $$\min_{P_G} \sum_{i \in \Omega_C} \left( \frac{1}{2} a_i P_{G_i}^2 + b_i P_{G_i} + c_i \right) \qquad \text{(Fma. 14)}$$

$$\text{s.t.} \quad P_{G_i} - P_{L_i} = \sum_{j \in \Omega_i} \frac{\theta_i - \theta_j}{X_{ij}}, \forall i \in \{1, \ldots, N_B\} \qquad \text{(Cdn. 15)}$$

$$\theta_1 = 0 \qquad \text{(Cdn. 16)}$$

$$\underline{P}_{G_i} \leq P_{G_i} \leq \overline{P}_{G_i}, \forall i \in \Omega_G \qquad \text{(Cdn. 17)}$$

$$-\overline{P}_{ij} \leq \frac{\theta_i - \theta_j}{X_{ij}} \leq \overline{P}_{ij}, \forall ij \in \Omega_L \qquad \text{(Cdn. 18)}$$

where the variables have the following meanings:
$P_{L_i}$: load at bus i;
$P_{G_i}$: generation at bus i;
$a_i$, $b_i$, $c_i$: cost parameters of generator at bus i;
$\theta_i$: angle at bus i;
$\underline{P}_{G_i}$, $\overline{P}_{G_i}$: lower and upper limit on generation;
$\Omega_G$: set of buses with generators;
$\Omega_L$: set of lines in the grid;
$\Omega_i$: set of buses connected to bus i;
$X_{ij}$: reactance of the line connecting buses i and j;
$\overline{P}_{ij}$: capacity of the line connecting buses i and j.

It can be derived from the first order optimality conditions that the following Equations 19-25 need to be fulfilled, $$\frac{\partial L}{\partial P_{G_i}} = a_i P_{G_i} + b_i - \lambda_i + \mu_i^+ - \mu_i^- = 0 \quad \text{(Eqn. 19)}$$

$$\frac{\partial L}{\mu_i^+} = P_{G_i} - \overline{P}_{G_i} \le 0 \quad \text{(Eqn. 20)}$$

$$\frac{\partial L}{\mu_i^-} = -P_{G_i} + \underline{P}_{G_i} \le 0 \quad \text{(Eqn. 21)}$$

$$\frac{\partial L}{\partial \theta_i} = \lambda_i \cdot \sum_{j\in\Omega_i}\frac{1}{X_{ij}} - \sum_{j\in\Omega_i}\lambda_j\frac{1}{X_{ij}} + \sum_{j\in\Omega_i}(\mu_{ij}-\mu_{ji})\frac{1}{X_{ij}} = 0 \quad \text{(Eqn. 22)}$$

$$\frac{\partial L}{\partial \lambda_i} = -P_{G_i} + P_{L_i} + \sum_{j\in\Omega_i}\frac{\theta_i-\theta_j}{X_{ij}} = 0 \quad \text{(Eqn. 23)}$$

$$\frac{\partial L}{\partial \mu_{ij}} = \frac{\theta_i - \theta_j}{X_{ij}} - \overline{P}_{ij} \le 0 \quad \text{(Eqn. 24)}$$

$$\frac{\partial L}{\partial \mu_{ji}} = -\frac{\theta_i - \theta_j}{X_{ij}} - \overline{P}_{ij} \le 0 \quad \text{(Eqn. 25)}$$

as well as the complementary slackness conditions for the inequality constraints and the positivity constraints on the μ's. Consequently, in order to find a solution to the DC optimal power flow ("DCOPF") problem, the above equation system needs to be solved. Equation 23 corresponds to a weighted sum of the marginal generator costs and the Lagrange multipliers of the line constraints.

In some embodiments it can be assumed that generators, loads, and storage devices are connected to nodes in the grid and an agent is assigned to each node. The algorithm described herein by which the agents coordinate is based on the consensus+innovations approach. Here, a general introduction to this approach is given, and then an explanation of how it can be used in a single step optimization is presented, which is followed by an extension to the multi-step case.

A consensus+innovations method and its variants is a generic approach for solving distributed decision-making problems in multi-agent networks. The decision-making setups that fall under the purview of consensus+innovations implementations typically involve collaborative distributed information processing such as estimation, optimization, and control in agent networks, in which each network agent has a priori access to only local information, such as knowledge of model parameters and sensed data, and inter-agent communication (interaction) is restricted to a pre-assigned sparse communication graph. Broadly speaking, in an consensus+innovations architecture, the autonomous agents or decision-makers can engage in local information processing and neighborhood communication to achieve or optimize the global decision-making task of interest.

For clarity in this description, the discussion of the consensus+innovations method is restricted to the distributed restricted agreement problem in multi-agent distributed networks. Those skilled in the art will recognize that the approach is relevant to other problem formulations. Formally, in an information processing network, of J agents, the restricted agreement problem consists of having the J agents agree on a common value v subject to the equality constraint (restriction) given by Equation 26, $$g(v) = \sum_{j=1}^{J} h_j(v) = \sum_{j=1}^{J}\sum_{n\in\Omega_j} d_n(v) = 0 \quad \text{(Eqn. 26)}$$

and inequality constraints specified by Condition 27, $$\underline{d}_n \le d_n(v) \le \overline{d}_n, \; n\in\Omega_j, j=1,\ldots,J \quad \text{(Cdn. 27)}$$

where $\Sigma_{j=1}^{J}|\Omega_j|=N$ for some positive integer N, i.e., the sets $\{\Omega_j\}_{j\in J}$ constitute a partition of $[1, \ldots, N]$, $d_n(\cdot)$, $n=1, \ldots, N$ are certain real-valued functions, and $\underline{d}_n$, $\overline{d}_n$, $\in[-\infty, \infty]$, for $n=1, \ldots, N$ are constants. Moreover, it is advantageous to find a distributed solution of the restricted agreement problem in which, (i) to start with, each agent j is only aware of its set of local functions $d_n(\cdot)$, $n\in\Omega_j$ and the corresponding inequality constraints given by Condition 27, and (ii) inter-agent communication for information exchange is restricted to a pre-assigned communication graph. Under broad assumptions on the local functions $d_n(\cdot)$'s and the inter-agent communication topology (to be made precise below), an iterative algorithm of the consensus+innovations type may be applied to solve the distributed restricted agreement problem specified above.

In an exemplary embodiment of the consensus+innovations method, each agent/maintains a local copy $v_j(i)$ of the variable v, which is iteratively updated, with i denoting the iteration index, as follows: (1) update local copy of common variable according to Equation 28, $$v_j(i+1) = v_j(i) - \beta_i \sum_{l\in\omega_j}(v_j(i)-v_l(i)) - \alpha_i\sum_{n\in\Omega_j}\hat{d}_n(i) \quad \text{(Eqn. 28)}$$

where $\alpha_i$ and $\beta_i$ are weight parameters, $\omega_j$ is the communication neighborhood of agent j as prescribed by the given inter-agent communication topology, i.e., the subset of network agents with which agent j can exchange information directly, and Equation 29, $$\hat{d}_n(i) = P_n[d_n(v_j(i))], \; n\in\Omega_j, \quad \text{(Eqn. 29)}$$

where $P_n[\cdot]$ denotes the projection operator onto the interval $[\underline{d}_n, \overline{d}_n]$; (2) update dependent variables according to Equation 29 to obtain $\hat{d}_n(i+1)$, $n\in\Omega_j$; and (3) exchange local value $v_j(i+1)$ with agents in the communication neighborhood $\Omega_j$ and increase iteration counter i.

Typical conditions that ensure convergence, i.e., $v_j(i)\to v$ as $i\to\infty$ for all j with v satisfying Equation 26 and Condition 27, are as follows: (1) the local functions' $d_n(\cdot)$'s are sufficiently regular (e.g., regularity conditions of the form of Lipschitz continuity, monotonicity, etc.); (2) the inter-agent communication network needs to be connected (i.e., there exists a path, possibly multi-hop, between any pair of agents; thus, the communication network may be quite sparse and in fact much sparser than the physical grid topology, which is typically relatively dense); and (3) the weight parameters $\alpha_i$, $\beta_i$ are positive and satisfy the following conditions: (a) as $i\to\infty$, the sequences $\{\alpha_i\}$ and $\{\beta_i\}$ are decaying, i.e., $\alpha_i \to 0$, $\beta_i \to 0$; (b) the excitations are persistent, as specified by Equation 30, $$\sum_{i \geq 0} \alpha_i = \sum_{i \geq 0} \beta_i = \infty \quad \text{(Eqn. 30)}$$

and (c) the consensus potential asymptotically dominates the innovation potential, i.e., $\beta_i/\alpha_i \to \infty$ as $i \to \infty$.

In the single step application, only the scheduling for one time step is considered. To this end, let $j=1, \ldots, J$ denote the nodes (agents) in the grid and let $n \in \Omega_j$ index the components (generators, loads, and storage devices) connected to node j. Also, let $N = \Sigma_{n \in \Omega_j} |\Omega_j|$ be the total number of grid components. The variable v that the agents need to agree on corresponds to the marginal cost of supply $\lambda$ for that time step, whereas the constraint g(v) that needs to be fulfilled is the power balance between supply and demand. The local component function $d_n(\lambda)$ is the power $P_n$ injected/drawn by component n, which can be given as a function of $\lambda$ by Equation 31, $$d_n(\lambda) = P_n(\lambda) = \frac{\lambda - b_n}{a_n} \quad \text{(Eqn. 31)}$$

According to Equation 28, each agent j carries out the iterative calculations specified by Equation 32, $$\lambda_j(i+1) = \lambda_j(i) - \beta_i \sum_{l \in w_j} (\lambda_j(i) - \lambda_l(i)) - \alpha_i \sum_{n \in \Omega_j} P_n(i) \quad \text{(Eqn. 32)}$$

Hence, the part of the innovation term assigned to agent j corresponds to the sum of power injections/consumptions of the components connected to node j, i.e., $n \in \Omega_j$. Notably, in some embodiments, $P_n(i)$ may be utilized as a performance-based quantity.

Then, the power injected/consumed $P_n(i)$ for $n \in \Omega_j$ is updated according to Equation 33, $$P_n(i+1) = \begin{cases} \frac{\lambda_j(i+1) - b_n}{a_n}, & P_n^{min} < \frac{\lambda_j(i+1) - b_n}{a_n} < P_n^{max} \\ P_n^{max}, & \frac{\lambda_j(i+1) - b_n}{a_n} \geq P_n^{max} \\ P_n^{min}, & \frac{\lambda_j(i+1) - b_n}{a_n} \leq P_n^{min} \end{cases} \quad \text{(Eqn. 33)}$$

Assuming that the only inter-temporal constraints are constraints on generation ramp rates and energy levels, the definitions for $P_n^{min}$, $P_n^{max}$ are given in Table I. The initial generator output and storage energy level are denoted by $P_{n,-1}$ and $E_{n,0}$, respectively, and T is the length of one time step. Consequently, the projection into the solution space in the single step application simply corresponds to limiting the power output to values within the given bounds.

Note that the inter-agent communication topology (i.e., which components communicate with one another) may differ significantly from the physical power system electrical coupling among the agents and is, in fact, typically much more sparse than the physical coupling topology. In particular, it can be assumed that there exists a path comprising one or more communication hops between any two pair of agents, i.e., the inter-agent communication network is connected. Moreover, note that, in the update rule specified by Equation 32, each agent needs to be aware of its local model parameters ($a_n$'s and $b_n$'s) only; this is unlike a centralized optimization approach in which each agent needs to communicate and coordinate with a fusion center, the latter having access to the model parameters of all the agents. Interestingly enough, it can be shown that, even under such restrictions on agent communication and lack of global model information, the proposed update rule converges to the optimal schedules at each agent.

TABLE I

INCORPORATION OF INTER-TEMPORAL CONSTRAINTS INTO UPPER AND LOWER BOUND FOR POWER INJECTION/WITHDRAWAL

| | $P_n^{min}$ | $P_n^{max}$ |
|---|---|---|
| Generator | $\min(\underline{P}_n, P_{n,-1} + \Delta \underline{P}_n)$ | $\max(\overline{P}_n, P_{n,-1} + \Delta \overline{P}_n)$ |
| Load | $\underline{P}_n$ | $\overline{P}_n$ |
| Storage | $\min\left(\underline{P}_n, \frac{1}{T}(E_{n,0} - \overline{E}_n)\right)$ | $\max\left(\overline{P}_n, \frac{1}{T}(E_{n,0} - \underline{E}_n)\right)$ |

In the multi-step application mentioned above, a horizon of multiple time steps in the future can be considered concurrently. This can result in an overall decrease in cost of supply, because preventive actions such as charging a storage device in anticipation of needed energy in the future can be taken. In this case, the consensus+innovations application becomes multi-dimensional, i.e., $\lambda_j$ and $P_n$, $n \in \Omega_j$ are vectors including the prices/marginal costs and the power output/consumption for the time steps within the horizon, respectively. The update given in Equation 32 still applies but now as a vector update resulting in an update for each time step k as specified by Equation 34, $$\lambda_{j,k}(i+1) = \lambda_{j,k}(i) - \beta_i \sum_{l \in w_j} (\lambda_{j,k}(i) - \lambda_{l,k}(i)) - \alpha_i \sum_{n \in \Omega_j} P_{n,k}(i) \quad \text{(Eqn. 34)}$$

with $k = 0, \ldots, K-1$.

The projection into the solution space can be achieved by the constrained least square minimization for each component $n \in \Omega_j$ specified by Formula 35 and Conditions 36-39 (for simplicity, the iteration counter (i+1) is omitted in $P_{n,k}(i+1)$ and $\lambda_{j,k}(i+1)$), $$\min_{P_n} \sum_{k=0}^{K-1} \left(P_{n,k} - \frac{\lambda_{j,k} - b_n}{a_n}\right)^2 \quad \text{(Fma. 35)}$$

s.t.

$$\underline{P}_n \leq P_{n,k} \leq \overline{P}_n, \quad k = 0, \ldots, K-1 \quad \text{(Cdn. 36)}$$

$$\Delta \underline{P}_n \leq P_{n,k} - P_{n,k-1} \leq \Delta \overline{P}_n, \quad k = 0, \ldots, K-1 \quad \text{(Cdn. 37)}$$

$$\underline{E}_n \leq E_{n,0} - \sum_{l=1}^{k} P_{n,l} \leq \overline{E}_n, \quad k = 0, \ldots, K-1 \quad \text{(Cdn. 38)}$$

$$E_{n,N} = E_{n,0} - \sum_{l=0}^{N-1} P_{n,l} = E_n^f \quad \text{(Cdn. 39)}$$

Constraint Conditions 38 and 39 are only applicable if component n is a storage device. If the component is a load and ramping of the load is unlimited, then constraint Condition 37 can either be neglected or its limits can be set to infinity. The same statements concerning communication topology and connectivity hold as in the single step application described above.

The extension to the optimal power flow application can be described for a single time step. Each bus (or agent or node) i updates the variables $\lambda_i$, $\theta_i$, and $P_{G_i}$ which are directly associated with that bus, and the $\mu_{i,j}$'s, which correspond to the constraints on the flows out of bus i onto lines ij. As will be seen, $\mu_i^+$, $\mu_i^-$ do not need to be known and therefore no update is needed.

The Langrange multipliers $\lambda_i$ in this case are updated according to Equation 40, $$\lambda_i(k+1) = \lambda_i(k) - \qquad \text{(Eqn. 40)}$$

$$\alpha_\theta \begin{pmatrix} \lambda_i(k) \cdot \sum_{j \in \Omega_i} \frac{1}{X_{ij}} - \\ \sum_{j \in \Omega_i} \lambda_j(k) \frac{1}{X_{ij}} + \\ \sum_{j \in \Omega_i} (\mu_{ij}(k) - \mu_{ji}(k)) \frac{1}{X_{ij}} \end{pmatrix} - \alpha_\lambda \begin{pmatrix} P_{G_i}(k) - P_{L_i} - \\ \sum_{j \in \Omega_i} \frac{\theta_i(k) - \theta_j(k)}{X_{ij}} \end{pmatrix}$$

where $\alpha_\theta$, $\alpha_\lambda > 0$ are tuning parameters.

Hence, the first order optimality conditions given by Equations 22 and 23 corresponding to the derivatives of the Lagrange function with respect to $\theta_i$ and $\lambda$, respectively, are used. The update makes intuitive sense, e.g., if the power balance given by Equation 23 is not fulfilled because generation is too high, it leads to a reduction in $\lambda_i$, which, on the other hand, as shown next, leads to a decrease in $P_{G_i}$. Furthermore, if no line constraints are binding, the $\mu$'s are equal to zero and the part of the update in the first row leads to finding an agreement between the $\lambda$'s at all buses (or nodes).

Knowing the value of the Lagrange multiplier $\lambda_i$, an update for the generation $P_{G_i}$ can be carried out as specified by Equation 41, $$P_{G_i}(k+1) = \frac{\lambda_i(k+1) - b_i}{a_i} \qquad \text{(Eqn. 41)}$$

The upper and lower limits $\overline{P}_{G_i}$ and $\underline{P}_{G_i}$ taken into account by projecting the value determined by Equation 41 into the feasible space, i.e., if it is greater than $\overline{P}_{G_i}$, $P_{G_i}(k+1)$ is set to that upper limit and similarly for the lower limits. This is equivalent to using the full Equation 19 including the multipliers $\mu_i^+$ and $\mu_i^-$ to update $P_{G_i}$. As these multipliers do not appear in any other constraint, it is not necessary to provide an update for them.

The bus (or node) angles can be updated according to Equation 42, $$\theta_i(k+1) = \theta_i(k) - \alpha_\lambda \left( -P_{G_i}(k) + P_{L_i} + \sum_{j \in \Omega_i} \frac{\theta_i(k) - \theta_j(k)}{X_{ij}} \right) \qquad \text{(Eqn. 42)}$$

with $\alpha_\lambda > 0$. Hence, the power balance equation, Equation 23, can be used for the update. This also makes intuitive sense, because if the power balance is not fulfilled and the load usage and power flowing onto the lines is greater than the generation at that bus, the angle is reduced which results in a reduction of the residual of that constraint. Notably, in some embodiments, the quantity $(-P_{G_i}(k)+P_{L_i})$ may be utilized as a performance-based quantity.

The Lagrange multipliers $\mu_{ij}, \mu_{ji}$ appear in the $\lambda$ updates given by Equation 40; as such, values and updates for these multipliers are needed. This update is given by Equations 43 and 44, $$\mu_{ij}(k+1) = \mu_{ij}(k) - \alpha_\mu \left( \overline{P}_{ij} - \frac{\theta_i(k) - \theta_j(k)}{X_{ij}} \right) \qquad \text{(Eqn. 43)}$$

$$\mu_{ji}(k+1) = \mu_{ji}(k) - \alpha_\mu \left( \overline{P}_{ij} + \frac{\theta_i(k) - \theta_j(k)}{X_{ij}} \right) \qquad \text{(Eqn. 44)}$$

Consequently, the inequalities given by Equations 24 and 25 are utilized. The positivity constraint on they's can be enforced by setting $\mu_{ij}(k+1)$ and/or $\mu_{ji}(k+1)$ equal to zero if the update resulting from Equations 43 and/or 44 provides negative values, respectively. Assuming that the current value for the line flow $P_{ij}=(\theta_i-\theta_j)/X_{ij}$ from bus i to bus j is positive but below its limit $\overline{P}_{ij}$ the update resulting from Equation 43 yields a decreasing value for $\mu_{ij}$ with a minimum value of zero due to the projection into the feasible space $\mu_{ij} \geq 0$. If the flow is above the line limit, the value for $\mu_{ij}$ increases, indicating a binding constraint.

The application of the multi-step consensus approach can proceed as follows. At time $t=t_1$ the goal is to determine the optimal settings $P_{n,k}$ for the generators, loads, and storage devices for the next $k=0, \ldots, K-1$ steps fulfilling all constraints on ramp rates, maximum generation output, energy level, etc. Hence, the optimization horizon corresponds to $t=t_1, \ldots, t_1+K$. The consensus+innovation algorithm as described above with respect to Equation 34 et seq. is used to determine these settings with i corresponding to the iteration counter. Once the agents have agreed on $\lambda_{j,k}$, $k=0, \ldots, K-1$ and optimal settings $P_{n,k}$, $k=0, \ldots, K-1$ have been found, the first step $P_{n,1}$ is applied, the optimization horizon is moved by one time step, and the consensus+innovation algorithm can be restarted for $t_2$.

The choice of the initial starting point in the iterative process of the consensus+innovation algorithm has great influence on the convergence of the algorithm. In one embodiment, it may be assumed that most of the time the external inputs such as the parameters $a_n$, $b_n$ and any upper and lower limits do not change drastically from one time step to the next. Hence, a reasonable approach may be to use the solution determined at the previous time step t−T as a starting point for the time step t.

Figure 3:
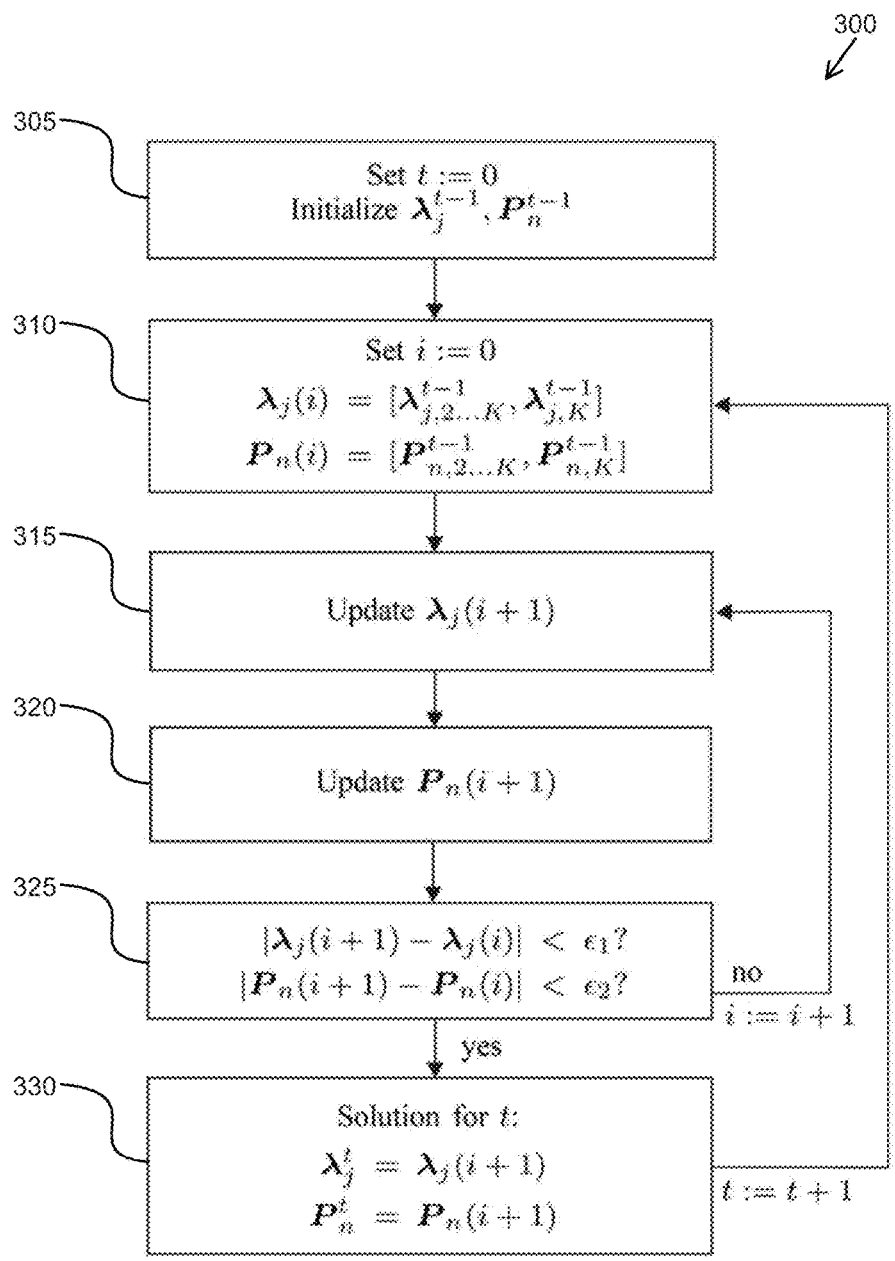
FIG. 3 is a detailed flowchart of a particular method of implementing a consensus+innovation algorithm in accordance with aspects of the present disclosure.

FIG. 3 illustrates a particular implementation of a consensus+innovation algorithm method 300 where the solution for time step t is denoted by $\lambda_j^t$, $P_n^t$. At step 305, in the very first time step $t=0$, no solution $\lambda_j^{t-1}$, $P_n^{t-1}$ for the previous time step is available to use as a starting point in the consensus+innovation algorithm. Hence, an initialization is required, e.g., by using a flat start or by using historic solution data. In the following time steps t, $\lambda_j^{t-1}$, $P_n^{t-1}$ correspond to the solution at the previous step t−1. An advantage of the multi-step application is that good initial settings for k=0, . . . , K−1 are available from the solution at the previous time step. Only the initial settings for the newly included time step k=K need to be found. An assumption can be made that the settings for k=K will be close to the settings at k=K−1, resulting in initial settings specified by Equations 45 and 46, $$\lambda_j(0) = [\lambda_{j,2} \ldots {}_N{}^{i-1}, \lambda_{j,N}{}^{i-1}] \quad \text{(Eqn. 45)}$$

$$P_n(0) = [P_{n,2} \ldots {}_N{}^{i-1}, P_{n,N}{}^{i-1}] \quad \text{(Eqn. 46)}$$

for the consensus+innovation algorithm. Then, starting with step 310, the iterative process of the consensus is carried out, i.e., $\lambda_j$, $P_n$ are updated at steps 315 (utilizing Equation 32 for single-step operation or Equation 34 for multi-step operation) and 320 (utilizing Equation 33 for single-step operation or Formula 35 and Conditions 36-39 for multi-step operation), and after each iteration stopping criteria can be evaluated at step 325. Such stopping criteria may include a predetermined condition to be met, such as, for example, a number of iterations and/or the results of subsequent iterations being within a predetermined threshold range of one another. If such a stopping criteria is met, for example, if changes in $\lambda_j$ and $P_n$ are lower than predetermined values of $\epsilon_1$ and $\epsilon_2$, respectively, the consensus+innovation iterations are stopped, method 300 may proceed to step 330, and the method may be restarted at step 310 for a shifted optimization horizon with initial values given by Equations 45 and 46. For a single step approach, the procedure is very similar to setting the horizon equal to K=1. In that case, $\lambda_j$, $P_n$ are scalars and the initial values for the consensus+innovation algorithm correspond to the values obtained at the previous time step.

The distributed scheduling algorithms of the consensus+ innovations type are robust to a wide class of perturbations resulting from intermittent inter-agent communication failures, noisy or quantized data exchange, and other forms of randomness in the communication infrastructure. For instance, due to data-packet scheduling and interference issues in multi-agent scenarios involving wireless agent-to-agent communication or infrastructure failures in wired communication environments, the designated communication links may not be active at all instants; moreover, even in the event of an active communication link between a pair of agents, the transmitted data may be noisy or distorted due to quantization and other channel effects. The consensus+ innovations scheduling structure stays valid under a wide range of such communication imperfections; for instance, by adding the square summability requirement $\Sigma_{i\geq 0}\alpha_i^2 < \infty$ on the innovations weight sequence $\{\alpha_i\}$, the effect of independent and identically distributed additive communication noise may be mitigated. For random communication link failures, as long as the network is connected in the mean, the convergence of the proposed iterative procedure to the optimal will be retained.

Figure 4:
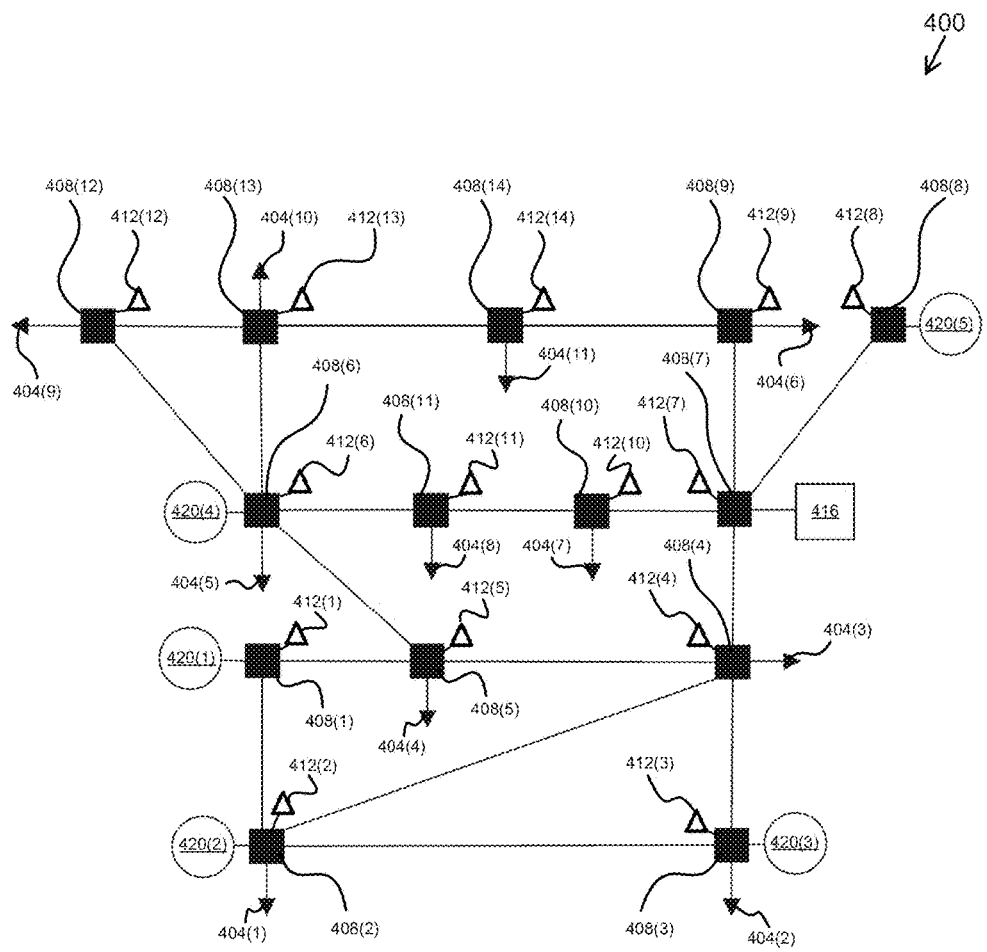
FIG. 4 is a schematic of an exemplary test system for demonstrating aspects of the present disclosure in a simulation.

Simulations were executed for the multi-step application described above. As shown in FIG. 4, the considered simulation grid 400 comprises eleven loads 404(1) to 404(11), fourteen nodes or buses 408(1) to 408(14), and fourteen agents 412(1) to 412(14), each agent 412(1) to 412(14) associated with one of buses 408(1) to 408(14). A storage entity 416 is located at bus 408(7), and generators or power generating entities 420(1-5) are located at buses 408(1), 408(2), 408(3), 408(6) and 408(8). The connections indicate communication lines between components in the grid. This test system was derived from the IEEE® 14-bus system using the physical connections as indications for communication lines. However, physical layer and communications channel connections do not necessarily have to coincide; that is, any number of physical layers could be associated with simulation grid 400 as shown in FIG. 4. Further, although agents 412(1) to 412(14) are depicted in FIG. 4 as each being associated with nodes directly connected to one or more power generating, electrical load, and/or storage entities, the agents may additionally or alternatively be associated with nodes not directly connected to one or more of such entities. The parameters for generators, loads and storage are given in Tables II-IV. It is assumed that the minimum generation level for all generators is 0pu and that the ramp up and down limits are equal, i.e., $\Delta \underline{P}_n = \Delta \overline{P}_n$. The simulations were carried out for a simulated 24-hour period in 5 minute intervals; the prediction horizon K was chosen to be equal to 20 time steps.

It can be assumed that the parameters for the generators and storage stay the same over a longer time period, while the parameters for the load change to reflect varying needs over the course of the day. Each load may be an aggregation of multiple loads. Varying needs for such an aggregated load are modeled by adjusting the parameter $b_n$ in the demand function and the minimum and maximum demand limits $\underline{P}_n$ and $\overline{P}_n$, respectively. It is assumed that the agent of each load predicts the parameters required to cover its consumption and then schedules the load according to the outcome of the distributed energy balancing management. However, the agents are allowed to adjust their predictions over time.

TABLE II

GENERATOR PARAMETERS (mu = monetary units)

| Bus | $a_n$ [mu/pu²] | $b_n$ [mu/pu] | $\Delta \overline{P}_n$ [pu/5 min] | $\overline{P}_n$ [pu] |
|---|---|---|---|---|
| 408(1) | 0.042 | 2.0 | 20 | 100 |
| 408(2) | 0.028 | 3.0 | 5 | 105 |
| 408(3) | 0.035 | 4.0 | 10 | 100 |
| 408(6) | 0.030 | 4.0 | 50 | 90 |
| 408(8) | 0.040 | 2.5 | 15 | 80 |

Figure 5:
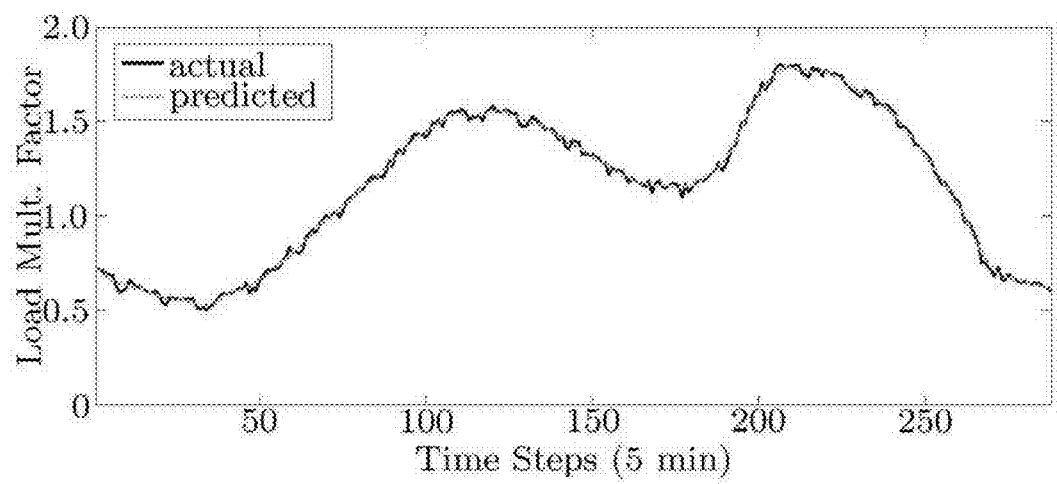
FIG. 5 is a load curve comparing a multiplication factor that actually occurs in a simulation with a predicted multiplication factor.

To simulate the varying demand, we multiply $b_n$, $\underline{P}_n$, and $\overline{P}_n$ with the values given in FIG. 5. The bold line in FIG. 5 illustrates the multiplication factor that actually occurs and the dotted line illustrates the multiplication factor that has been predicted. Furthermore, it is assumed that predictions improve the closer the predicted time step to the current time step, i.e., for the first five time steps k=0, . . . , 4 in the prediction horizon, the errors are reduced from what is shown in FIG. 5 inversely proportionally to k.

The tuning parameters $\alpha$ and $\beta$ were set according to Condition 47, $$\alpha_i = \frac{0.055}{i^{0.98}}, \quad \beta_i = \frac{0.15}{i^{0.001}} \quad \text{(Cdn. 47)}$$

where i is the iteration counter. Stopping tolerances as defined in FIG. 3 were set according to Condition 48, $$\epsilon_1 = 0.0001, \epsilon_2 = 0.001. \quad \text{(Cdn. 48)}$$

Figure 6:
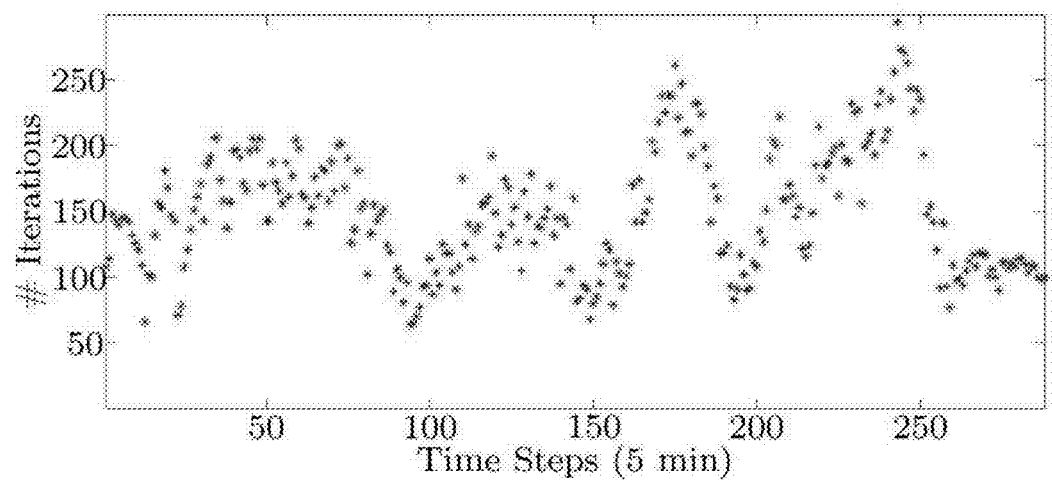
FIG. 6 is a scatter chart depicting the number of interactions required for an algorithm simulation implemented in accordance with aspects of the present invention to converge.

The number of iterations required to converge given the convergence criteria and simulation parameters defined in the previous section are given in FIG. 6. Depending on the time step, the algorithm converges within 50 to 280 iterations. If accuracy is to be improved, more iteration steps will be necessary. It should be noted that the same settings for $\alpha_i$ and $\beta_i$ are used for each time step. Hence, making these settings adaptive based on, e.g., learning would improve convergence.

TABLE III

LOAD PARAMETERS (mu = monetary units)

| Bus | $a_n$ [mu/pu²] | $b_n$ [mu/pu] | $\underline{P}_n$ [pu] | $\overline{P}_n$ [pu] |
|---|---|---|---|---|
| 408(2) | 0.040 | 7.5 | −50 | −5 |
| 408(3) | 0.030 | 6.0 | −40 | −3 |
| 408(4) | 0.035 | 8.0 | −80 | −6 |
| 408(5) | 0.032 | 6.5 | −30 | −2 |
| 408(6) | 0.020 | 7.5 | −70 | −8 |
| 408(9) | 0.030 | 8.0 | −80 | −10 |
| 408(10) | 0.038 | 7.0 | −40 | −5 |
| 408(11) | 0.035 | 7.5 | −25 | −2 |
| 408(12) | 0.040 | 8.0 | −90 | −8 |
| 408(13) | 0.035 | 7.0 | −30 | −2 |
| 408(14) | 0.042 | 8.0 | −80 | −10 |

TABLE IV

STORAGE PARAMETERS (mu = monetary units)

| Bus | $a_n$ [mu/pu²] | $\Delta \overline{P}_n$ [pu] | $\overline{P}_n$ [pu/5 min] | $\overline{E}_n$ [puh] |
|---|---|---|---|---|
| 408(7) | 0.01 | 50 | 50 | 20 |

Figure 7:
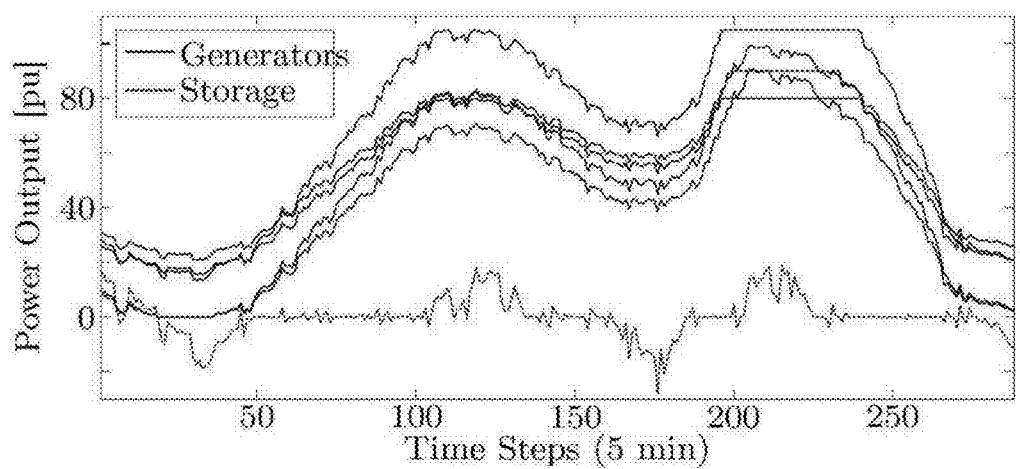
FIG. 7 is a graph depicting simulation generation and storage power output.
Figure 8:
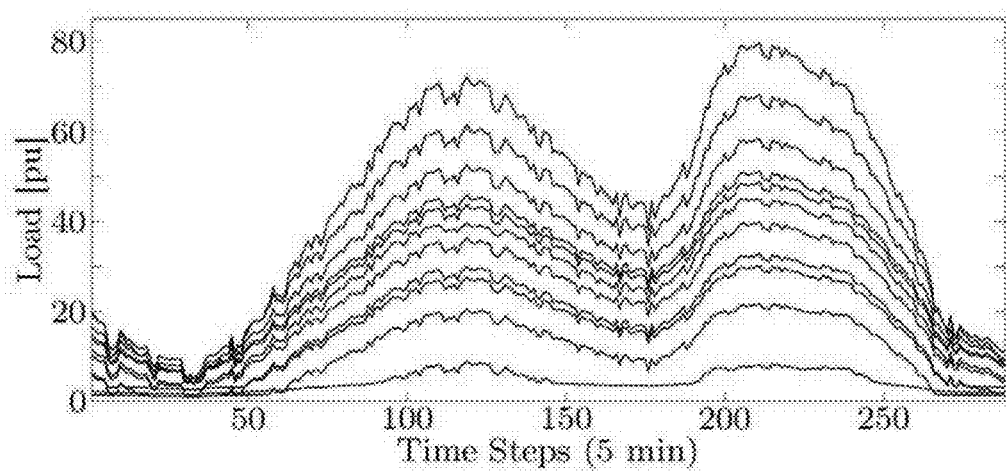
FIG. 8 is a graph depicting simulation power consumption by individual loads.
Figure 9:
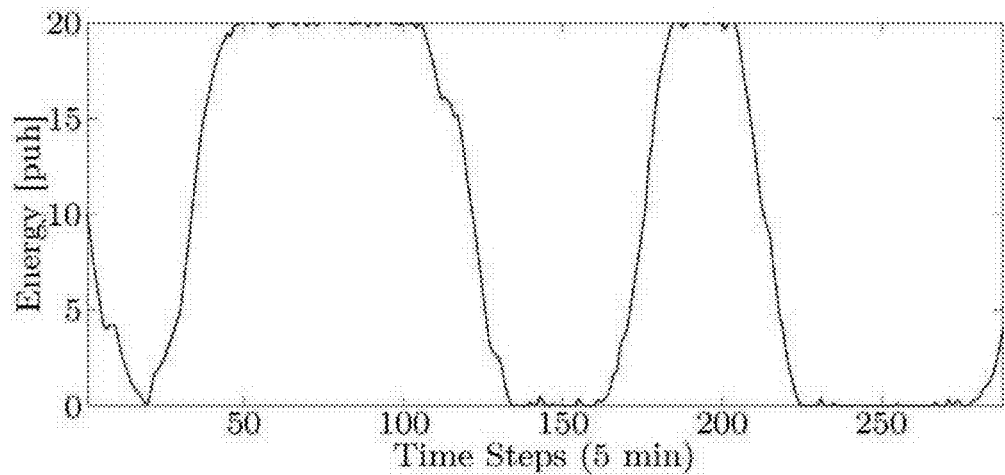
FIG. 9 is a graph depicting energy level in storage during simulation.
Figure 10:
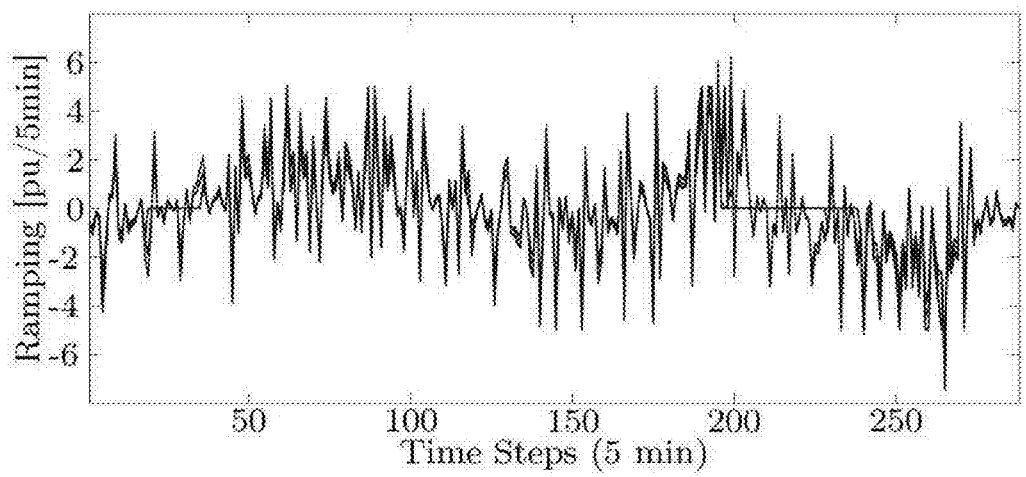
FIG. 10 is a graph depicting the ramping of generators during simulation.
Figure 11:
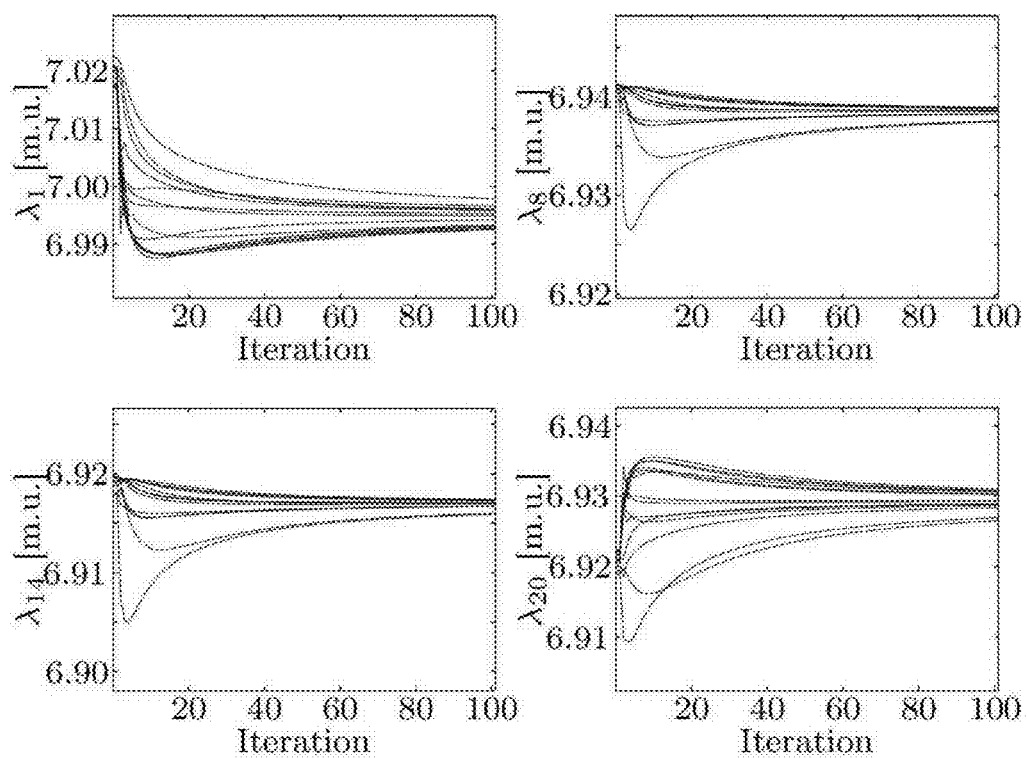
FIG. 11 is a set of graphs depicting the evolution of $\lambda$ for the consensus+innovation iterations during simulation at time step t=160.

FIG. 7 shows the generation and the storage power output settings over the course of the simulated time range. It can be seen that the proposed algorithm is capable of successfully taking into account upper and lower limits on generation capacity. FIG. 8 provides the consumption by the individual loads. At the beginning and the end of the simulation there are multiple time steps during which loads reach their lower limits. In FIG. 9, the resulting level of energy in the storage device is given. The storage is mostly used for arbitrage, i.e., charging in low load situations and discharging in high load situations, allowing for a reduced required generation capacity. Furthermore, it provides support in balancing out some of the short term variability. FIG. 10 provides the ramping of the generators, indicating that constraints on ramp rates are met. To provide insight into the convergence behavior, FIG. 11 shows the evolution of $\lambda$ for the consensus iterations at time step t=160. The dimension of $\lambda$ for each node j is equal to the prediction horizon. Here, the $\lambda$'s at all nodes for steps k=1, 8, 14, 20 in the prediction horizon are shown.

Figure 12A:
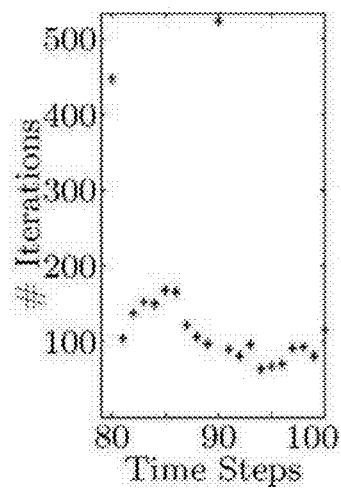
FIGS. 12A-12C are graphs depicting the number of interactions to converge, the generator outputs and the ramp rates during simulation.
Figure 12B:
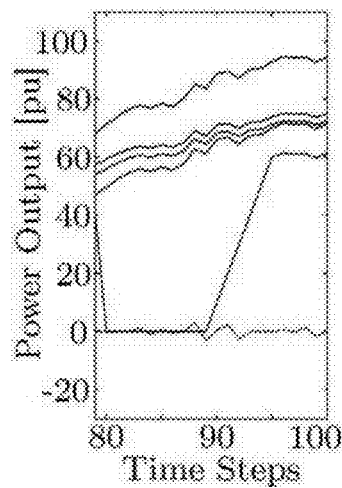
Figure 12C:
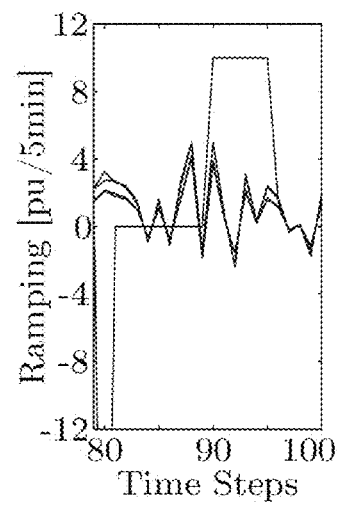

An advantage of the fully distributed approach is that it allows for a plug-and-play mechanism. Hence, in the following simulation, the performance of the algorithm of the present invention is tested for the case in which the generator at node 3 is disconnected at time step t=80 and reconnected at time t=90. FIG. 12 gives the number of iterations to converge, the generator outputs and the ramp rates. It can be seen in FIG. 12A that convergence is achieved within 500 iterations in the time steps of the disconnection and reconnection. The iterations for the other time steps stay in the range as in FIG. 6. The reason for the increased number of iterations is the fact that the disconnection/reconnection is assumed to have not been predicted; hence, the initial point for the consensus+innovation algorithm is not as accurate as with no disconnection. FIGS. 12B and 12C show the disconnect of the generator and the increase in power injection at the maximum ramp rate as soon as it is reconnected.

Figure 13:
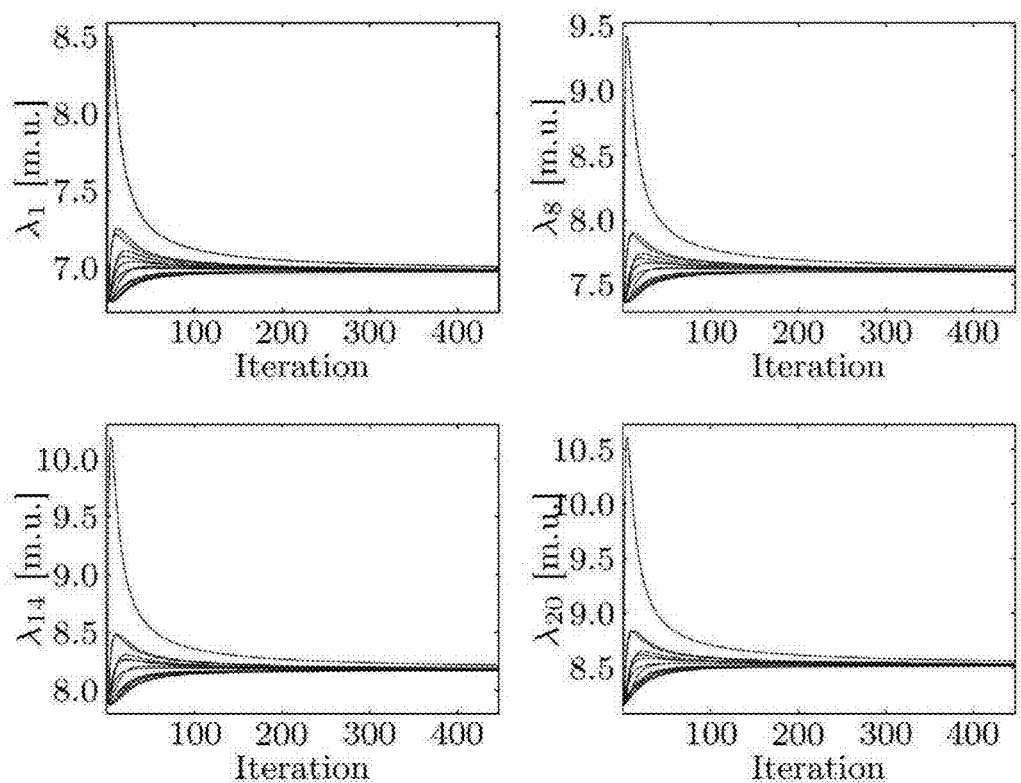
FIG. 13 is a set of graphs depicting the evolution of $\lambda$ during simulation at time step t=80.
Figure 14:
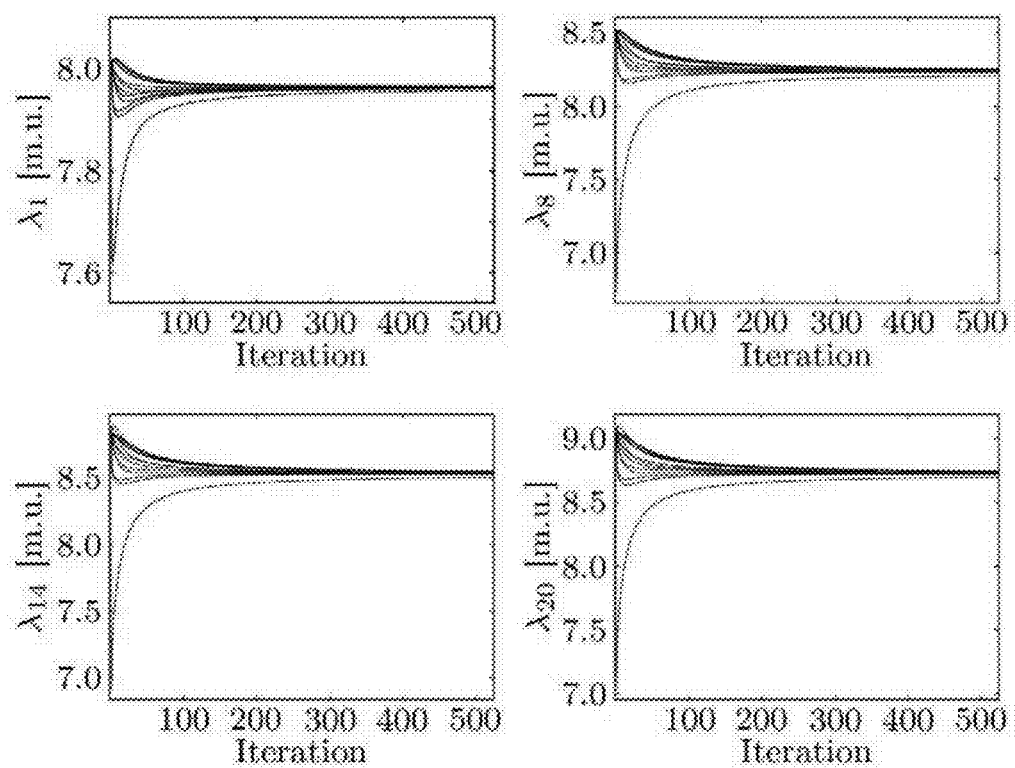
FIG. 14 is a set of graphs depicting the evolution of $\lambda$ during simulation at time step t=90.

FIGS. 13 and 14 show the evolution of the $\lambda$'s over the iteration of the consensus+innovation algorithm. It is obvious that a greater correction from the initial point is required, which leads to a higher number of iterations to fulfill the stopping criterion.

It is to be noted that any one or more of the aspects and embodiments described herein, such as aspects and embodiments of an agent, may be conveniently implemented using one or more machines, for example, one or more computing devices programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Figure 15:
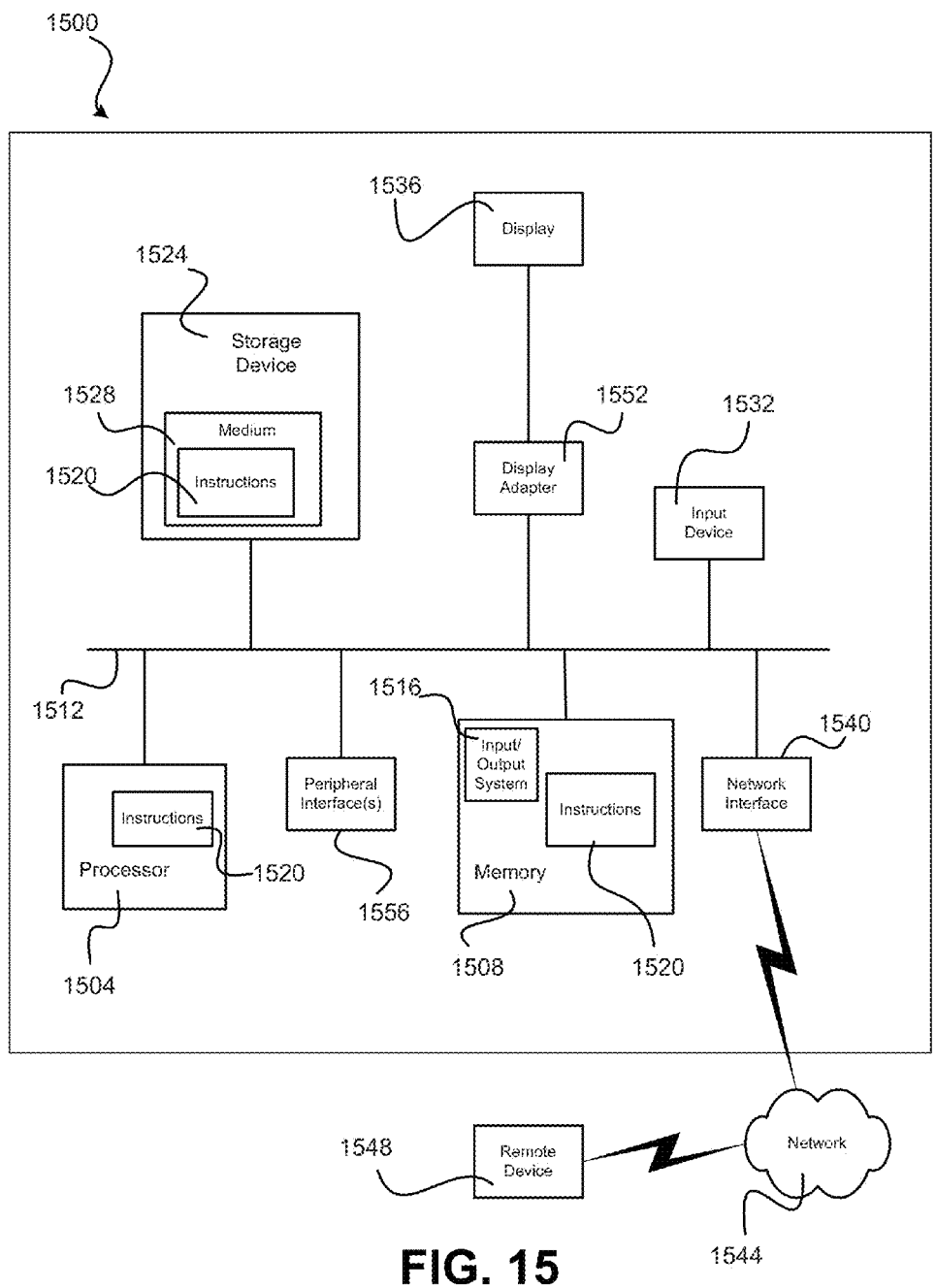
FIG. 15 is a block diagram of a computing system that can be used to implement any one or more of the methodologies disclosed herein and any one or more portions thereof.

Examples of a computing device include, but are not limited to, a general purpose computer containing one or more microprocessors, an application-specific integrated circuit, a system-on-chip, a web appliance, or any machine capable of executing a sequence of instructions that specify an action to be taken by that machine, and any combinations thereof FIG. 15 shows a diagrammatic representation of one embodiment of a computing device in the exemplary form of a computer system 1500 that can be used to effect an agent within which a set of instructions may be executed for performing any one or more of the aspects and/or methodologies of the present disclosure. It is also contemplated that multiple computing devices may be utilized to implement a specially configured set of instructions for causing one or more of the devices to perform any one or more of the aspects and/or methodologies of the present disclosure. Computer system 1500 includes one or more processors 1504 and a memory 1508 that communicate with one another, and with other components, via a bus 1512. Bus 1512 may include any of several types of bus structures including, but not limited to, a memory bus, a memory controller, a peripheral bus, a local bus, and any combinations thereof, using any of a variety of bus architectures.

Memory 1508 may include various components (e.g., machine readable media) including, but not limited to, a random access memory component, a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable media) instructions (e.g., software) 1520 embodying any one or more of the aspects and/or methodologies of the present disclosure. In another example, memory 1508 may further include any number of program modules including, but not limited to, an operating system, one or more application programs, other program modules, program data, and any combinations thereof.

Computer system 1500 may also include a storage device 1524. Examples of a storage device (e.g., storage device 1524) include, but are not limited to, a hard disk drive, a magnetic disk drive, an optical disc drive in combination with an optical medium, a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1524 (or one or more components thereof) may be removably interfaced with computer system 1500 (e.g., via an external port connector (not shown)). Particularly, storage device 1524 and an associated machine-readable medium 1528 may provide nonvolatile and/or volatile storage of machine-readable instructions, data structures, program modules, and/or other data for computer system 1500. In one example, software 1520 may reside, completely or partially, within machine-readable medium 1528. In another example, software 1520 may reside, completely or partially, within processor 1504.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. A network interface device, such as network interface device 1540, may be utilized for connecting computer system 1500 to one or more of a variety of networks, such as network 1544, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1544, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image to a display device, such as display device 1536. Examples of a display device include, but are not limited to, a liquid crystal display (LCD), a cathode ray tube (CRT), a plasma display, a light emitting diode (LED) display, and any combinations thereof. Display adapter 1552 and display device 1536 may be utilized in combination with processor 1504 to provide graphical representations of aspects of the present disclosure. In addition to a display device, computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of determining a solution for balancing supply and demand to achieve a chosen performance in an electric power network that includes: a plurality of nodes interconnected with one another via power lines; a plurality of electrical entities connected, correspondingly and respectively, to the plurality of nodes; and a plurality of agents associated, correspondingly and respectively, with the plurality of nodes, wherein:

each of the plurality of electrical entities is one of 1) an electrical load entity, 2) an electric power generating entity, and 3) an energy storage entity;

the plurality of agents are in communication with one another and are configured to execute corresponding respective portions of a set of distributed balancing algorithms, applicable to the entirety of the electric power network, so as to determine the solution amongst themselves in a distributed manner; and the solution is implemented by controlling one or more of the electrical entities connected to the plurality of nodes;

the method comprising:

receiving, at a first agent of the plurality of agents, one or more sets of first balancing parameters from at least one second agent of the plurality of agents, the one or more sets of first balancing parameters comprising electricity pricing parameters and electrical grid parameters;

executing, by the first agent, a first corresponding portion of the set of distributed balancing algorithms using the one or more sets of first balancing parameters and a first performance-based quantity to generate one or more second balancing parameters; and providing, by the first agent, the one or more second balancing parameters to at least one third agent of the plurality of agents;

wherein said receiving, said executing, and said providing contribute to the solution implemented to control the one or more of the electrical entities connected to the plurality of nodes.

2. A method according to claim 1, wherein the third agent is the second agent.

3. A method according to claim 1, further comprising:

receiving, at the first agent, one or more third balancing parameters from one or more of the plurality of electrical entities electrically connected to the electric power network;

wherein said executing the first corresponding portion of the set of balancing algorithms includes using the one or more sets of first balancing parameters and the third balancing parameters to generate the one or more second balancing parameters.

4. A method according to claim 1, further comprising determining, by the first agent, one or more adjustments to be made in the electric power network as a function of the one or more second balancing parameters.

5. A method according to claim 4, further comprising sending, by the first agent, information to one or more of the plurality of electrical entities as a function of at least one of the one or more second balancing parameters and the one or more adjustments to be made.

6. A method according to claim 4, wherein the one or more adjustments to be made comprise modifications to one or more of nodal power injections, storage entity power consumption, storage entity power production, load entity power consumption, and generator entity power production.

7. A method according to claim 1, wherein said executing the first corresponding portion of the set of balancing algorithms includes executing a set of consensus+innovation algorithms.

8. A method according to claim 7, wherein said executing a set of consensus+innovation algorithms includes executing a set of consensus+innovation algorithms that facilitate agreement on an optimal incremental price among the plurality of agents.

9. A method according to claim 1, wherein said executing the first corresponding portion of the set of balancing algorithms includes executing a set of balancing algorithms that implement a multi-step optimization that incorporates inter-temporal constraints.

10. A method according to claim 1, wherein the electric power network has a physical topology and said executing a set of balancing algorithms includes executing a set of balancing algorithms that account for power generating ramp rate constraints imposed by the physical topology and transmission line limits/capacities.

11. A method according to claim 1, wherein said executing the first corresponding portion of the set of balancing algorithms includes generating the one or more second balancing parameters using iterative calculations that terminate only when a predetermined condition is met.

12. A method according to claim 11, wherein the predetermined condition is one or more of a number of iterations and a determination that results of subsequent ones of the iterative calculations are within a predetermined threshold range of one another.

13. A method according to claim 1, further comprising:

receiving, at the second agent, one or more sets of third balancing parameters from the first agent, the one or more sets of third balancing parameters comprising electricity pricing parameters and electrical grid parameters;

executing, by the second agent, a second corresponding portion of the set of balancing algorithms using the one or more sets of third balancing parameters and a second performance-based quantity to generate one or more fourth balancing parameters; and providing, by the second agent, the one or more fourth balancing parameters to the at least one third agent of the plurality of agents.

14. A method according to claim 13, wherein the first and second agents execute the first and second corresponding portions of the set of balancing algorithms substantially simultaneously.

15. A machine-readable storage medium containing machine-executable instructions for performing a method of determining a solution for balancing supply and demand to achieve a chosen performance in an electric power network that includes: a plurality of nodes interconnected with one another via power lines; a plurality of electrical entities connected, correspondingly and respectively, to the plurality of nodes; and a plurality of agents associated, correspondingly and respectively, with the plurality of nodes, wherein:

each of the plurality of electrical entities is one of 1) an electrical load entity, 2) an electric power generating entity, and 3) an energy storage entity;

the plurality of agents are in communication with one another and are configured to execute corresponding respective portions of a set of distributed balancing algorithms, applicable to the entirety of the electric power network, so as to determine the solution amongst themselves in a distributed manner; and the solution is implemented by controlling one or more of the electrical entities connected to the plurality of nodes:

said machine-executable instructions comprising:

a first set of machine-executable instructions for receiving, at a first agent of the plurality of agents, one or more sets of first balancing parameters from at least one second agent of the plurality of agents, the one or more sets of first balancing parameters comprising electricity pricing parameters and electrical grid parameters;

a second set of machine-executable instructions for executing, by the first agent, a first corresponding portion of the set of distributed balancing algorithms using the one or more sets of first balancing parameters and a first performance-based quantity to generate one or more second balancing parameters; and a third set of machine-executable instructions for providing, by the first agent, the one or more second balancing parameters to at least one third agent of the plurality of agents;

wherein the receiving, the executing, and the providing contribute to the solution implemented to control the one or more of the electrical entities connected to the plurality of nodes.

16. A machine-readable storage medium according to claim 15, wherein the third agent is the second agent.

17. A machine-readable storage medium according to claim 15, further comprising:

a fourth set of machine-executable instructions for receiving, at the first agent, one or more third balancing parameters from one or more of the plurality of electrical entities electrically connected to the electric power network;

wherein said second set of machine-executable instructions includes machine-executable instructions for using the one or more sets of first balancing parameters and the third balancing parameters to generate the one or more second balancing parameters.

18. A machine-readable storage medium according to claim 15, further comprising a fourth set of machine-executable instructions for determining, by the first agent, one or more adjustments to be made in the electric power network as a function of the one or more second balancing parameters.

19. A machine-readable storage medium according to claim 18, further comprising a fifth set of machine-executable instructions for sending, by the first agent, information to one or more of the plurality of electrical entities as a function of at least one of the one or more second balancing parameters and the one or more adjustments to be made.

20. A machine-readable storage medium according to claim 18, wherein the one or more adjustments to be made comprise modifications to one or more of nodal power injections, storage entity power consumption, storage entity power production, load entity power consumption, and generator entity power production.

21. A machine-readable storage medium according to claim 15, wherein said second set of machine-executable instructions includes machine-executable instructions for executing a set of consensus+innovation algorithms.

22. A machine-readable storage medium according to claim 21, wherein said machine-executable instructions for executing a set of consensus+innovation algorithms includes machine-executable instructions for executing a set of consensus +innovation algorithms that facilitate agreement on an optimal incremental price among the plurality of agents.

23. A machine-readable storage medium according to claim 15, wherein said second set of machine-executable instructions includes machine-executable instructions for executing a set of balancing algorithms that implement a multi-step optimization that incorporates inter-temporal constraints.

24. A machine-readable storage medium according to claim 15, wherein the electric power network has a physical topology and said second set of machine-executable instructions includes machine-executable instructions for executing a set of balancing algorithms that account for power generating ramp rate constraints imposed by the physical topology and transmission line limits/capacities.

25. A machine-readable storage medium according to claim 15, wherein said second set of machine-executable instructions includes machine-executable instructions for generating the one or more second balancing parameters using iterative calculations that terminate only when a predetermined condition is met.

26. A machine-readable storage medium according to claim 25, wherein the predetermined condition is one or more of a number of iterations and a determination that results of subsequent ones of the iterative calculations are within a predetermined threshold range of one another.

27. A machine-readable storage medium according to claim 15, further comprising:

a fourth set of machine-executable instructions for receiving, at the second agent, one or more sets of third balancing parameters from the first agent, the one or more sets of third balancing parameters comprising electricity pricing parameters and electrical grid parameters;

a fifth set of machine-executable instructions for executing, by the second agent, a corresponding second portion of the set of balancing algorithms using the one or more sets of third balancing parameters and a second performance-based quantity to generate one or more fourth balancing parameters; and a sixth set of machine-executable instructions for providing, by the second agent, the one or more fourth balancing parameters to the at least one third agent of the plurality of agents.

28. A machine-readable storage medium according to claim 27, wherein the first and second agents execute the first and second corresponding portions of the set of balancing algorithms substantially simultaneously.

29. An apparatus comprising a processor and memory, the memory containing computer executable instructions, which, when executed, cause the processor to execute a method according to claim 1.

* * * * *

UNITED STATES PATENT AND TRADEMARK OFFICE
CERTIFICATE OF CORRECTION

| | | |
|---|---|---|
| PATENT NO. | : 9,760,957 B2 | Page 1 of 1 |
| APPLICATION NO. | : 14/334106 | |
| DATED | : September 12, 2017 | |
| INVENTOR(S) | : Gabriela Hug et al. | |

It is certified that error appears in the above-identified patent and that said Letters Patent is hereby corrected as shown below:

In the Specification

Please insert the following paragraph in Column 1 beginning at Line 12:
--STATEMENT OF GOVERNMENT INTEREST
This invention was made with United States government support under DE-AR0000233 awarded by the U.S. Department of Energy. The U.S. government has certain rights in the invention.--

Signed and Sealed this
Seventh Day of January, 2025

Derrick Brent
*Acting Director of the United States Patent and Trademark Office*